United States Patent [19]

Ohmori

[11] Patent Number: 4,613,902

[45] Date of Patent: Sep. 23, 1986

[54] METHOD OF BROADCASTING AN ENCODED VIDEO SIGNAL AND A RECEIVING APPARATUS FOR DECODING THE SIGNAL

[75] Inventor: Shohi Ohmori, Tachikawa, Japan

[73] Assignee: Sony Corporation, Tokyo, Japan

[21] Appl. No.: 582,816

[22] Filed: Feb. 23, 1984

[30] Foreign Application Priority Data

Feb. 23, 1983 [JP] Japan ................................. 58-28879

[51] Int. Cl.⁴ ............................................ H04N 7/167
[52] U.S. Cl. .................................... 358/124; 358/121; 358/122; 358/123
[58] Field of Search ............... 358/114, 122, 123, 124, 358/121

[56] References Cited

U.S. PATENT DOCUMENTS 3,919,462  11/1975  Hartung et al. ..................... 358/117
4,257,065  3/1981   Papay ................................. 358/124
4,511,919  4/1985   Forgey et al. ...................... 358/122

Primary Examiner—Stephen C. Buczinski
Assistant Examiner—Melissa Koltak
Attorney, Agent, or Firm—Lewis H. Eslinger; Alvin Sinderbrand

[57] ABSTRACT

A video signal is encoded prior to broadcasting by inverting portions of the signal about an encoding axis at a predetermined reference level. To enable the reference level to be determined accurately after the received signal has been recorded and played back using a VTR having a noise reduction circuit, two identification signals having the same level are included in two consecutive horizontal periods of the signal, respectively. The level of the identification signal in the second horizontal period is unaffected by the noise reduction circuit. A decoding circuit detects the level of that identification signal and uses it to generate a decoding axis having the reference level. The decoding circuit at the receiver is thus able to accurately restore the encoded signal by reinverting the inverted portions about a decoding axis having the same level as the encoding axis.

11 Claims, 17 Drawing Figures

FIG. 1A
FIG. 1B
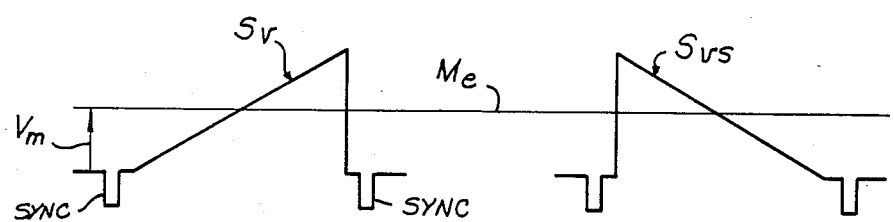
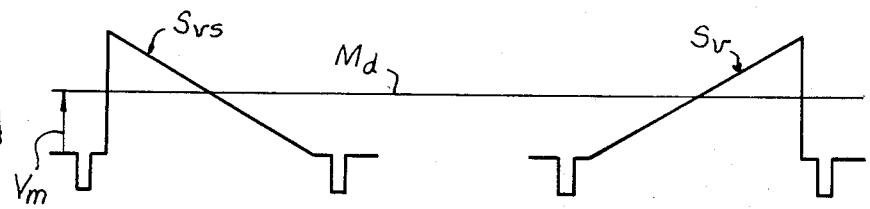
FIG. 2A
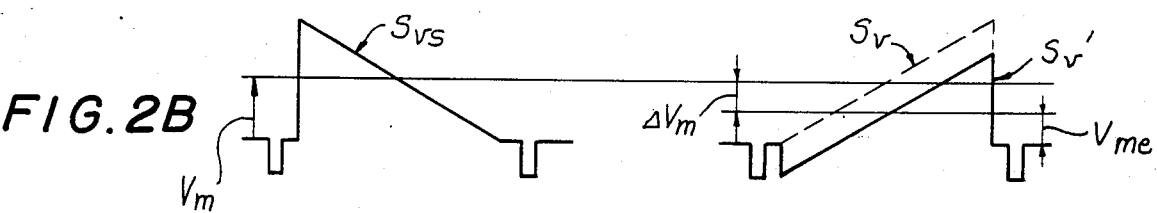
FIG. 2B

METHOD OF BROADCASTING AN ENCODED VIDEO SIGNAL AND A RECEIVING APPARATUS FOR DECODING THE SIGNAL

BACKGROUND OF THE INVENTION

1. Field of the Invention

The present invention relates to an encoded video signal and, more particularly, to a method for broadcasting an encoded video signal and to receiving apparatus for decoding the video signal.

2. Description of the Prior Art

A video signal can be encoded before broadcasting to prevent the use of the video signal unless the coding technique is known. Certain "pay-TV" systems are based on the payment of a fee for a device that is programmed for the particular coding technique being used so that the received signal can be used to generate a television picture.

Those systems have encountered a problem when the coded video signal is recorded by the subscriber using a video tape recorder (VTR). VTR's normally have noise reduction circuits to mask noise in the signal when it is played back. Unfortunately, noise reduction circuits can also mask information in the broadcast signal which is necessary for decoding the signal. Thus, when the recorded, encoded signal is played back through the receiver apparatus, it often will not be properly decoded.

SUMMARY OF THE INVENTION

It is an object of the present invention to overcome the disadvantages of the prior art.

It is another object of the present invention to provide an encoded video signal which includes identification information for use in decoding the signal at a receiver, which information is not masked by the noise reduction circuit of a VTR.

It is yet another object of the present invention to provide receiving apparatus for decoding encoded video signal including such identification information.

In accordance with an aspect of the present invention, an encoded video signal can be broadcast with a scrambled portion encoded prior to broadcasting using an encoding axis at a predetermined reference level and first and second identification signals in consecutive horizontal periods of the video signal at substantially the same identification level in both of the periods. The reference level and the identification level have a predetermined relationship. The signal is decoded at a receiving apparatus by detecting the level of the second identification signal and generating in response to that level a decoding axis at the reference level which was used to encode the signal.

Further objects, features and advantages of the present invention will become apparent when considering the detailed description set out below.

BRIEF DESCRIPTION OF THE DRAWINGS

FIG. 1A illustrates a portion of an uncoded video signal to be broadcast.

FIG. 1B illustrates the video signal in FIG. 1A after it has been encoded using a scrambling technique in which the signal portion is inverted about an encoding axis at a predetermined reference level.

FIG. 2A illustrates the scrambled video signal shown in FIG. 1B as received and as properly unscrambled.

FIG. 2B illustrates the encoded video signal shown in FIG. 1B as received and as improperly unscrambled because of an error in the reference level generated by the receiving apparatus.

DETAILED DESCRIPTION OF THE PREFERRED EMBODIMENTS

The present invention can best be understood by first having an understanding of video signal encoding techniques and how prior art VTR noise reduction circuits interfere with the proper functioning of those techniques.

FIG. 1A shows a portion of an original video signal. The portion depicted includes a horizontal synchronizing pulse SYNC and a video information portion $S_v$ immediately following the SYNC pulse, which together form a horizontal scanning period of the video signal. The end of that horizontal period is defined by another horizontal synchronizing pulse, SYNC, which begins the next horizontal scanning period of the signal.

FIG. 1B illustrates the same video signal encoded prior to being broadcast. The signal portion $S_v$ is scrambled by inverting it about an encoding axis $M_e$ at a predetermined reference level $V_m$ to provide the scrambled portion of the video signal $S_{vs}$ shown in FIG. 1B. The reference level $V_m$ is chosen relative to the pedestal level of the signal immediately proceding or following the SYNC pulse. The SYNC pulses are not inverted because to do so would make the restoration of the signal unnecessarily complicated.

The entire video signal includes non-inverted portions arranged in a predetermined pattern with inverted portions. "Key codes" and other information (not shown) are also included in the signal for use by the receiver to detect the encoding technique, thus enabling the signal to be unscrambled. Generally, the scrambled portions will include inverted and non-inverted vertical intervals of the signal arranged in a pattern that is detectable at the receiver by using the coding information.

To restore the inverted portions of the signal being received, the receiver provides a decoding axis $M_d$ at the reference level $V_m$ and inverts the received signal $S_{vs}$ back to its original form $S_v$, as shown in FIG. 2A. However, errors in setting the reference level at the receiver can occur. For example, electronic components in the receiver may have characteristics that cannot be precisely controlled, for example, because of ambient temperature fluctuations. In that case the reference level $V_m$ can be off by an amount such as $\Delta V_m$ shown in FIG. 2B, resulting in an erroneously unscrambled signal. In other words, the decoding axis is set at $V_{me}$ instead of $V_m$, and inversion about that axis results in the signal $S_v'$ instead of the correct signal $S_v$ shown in the dash line in FIG. 2B.

Figure 3:
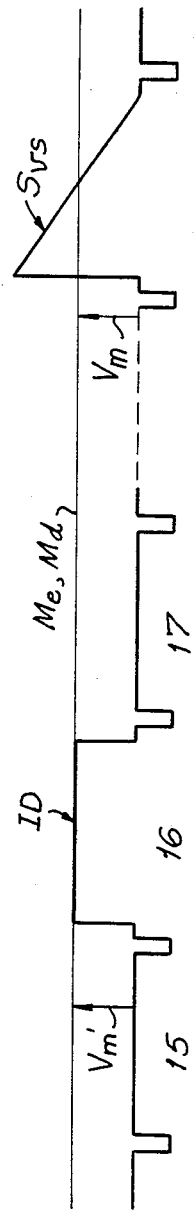
FIG. 3 illustrates a portion of a video signal which includes an identification signal used by the receiving apparatus to determine the reference level.

To overcome that problem indentification information is used in the signal. The vertical blanking interval of the video signal portion depicted in FIG. 3 has an identifi- cation signal ID included in the sixteenth horizontal period. The scrambled portion $S_{vs}$ of the signal is also shown in FIG. 3. The identification signal ID is broadcast at a predetermined identification level $V_m'$ above the pedestal level of the signal. The identification level $V_m'$ has a known value relative to the reference level $V_m$ (in FIG. 3 they are the same). Since the identification level $V_m'$ will change under the same influences as the reference level $V_m$, and the identification level is detectable at the receiver by sampling the identification signal ID, the reference level $V_m$ can be accurately set regardless of conditions at the receiver.

Figure 4:
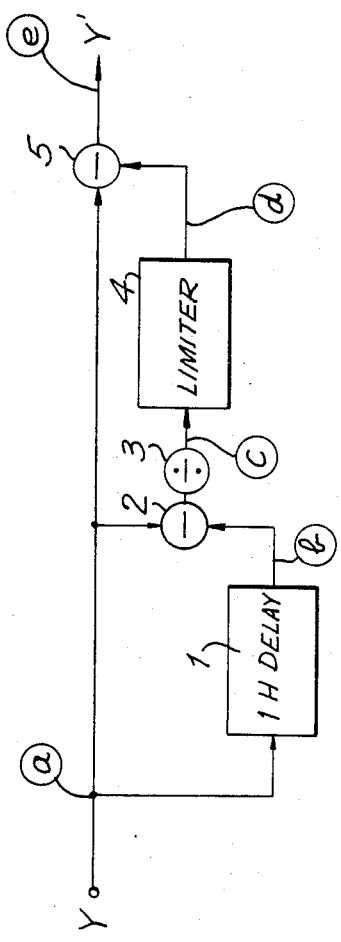
FIG. 4 schematically illustrates a noise reduction circuit used in prior art VTR's.

FIG. 4 shows a prior art noise reduction circuit used in conventional VTR's. The noise reduction circuit accepts the video signal Y and provides it to a main circuit path and to a parallel circuit path which includes a delay circuit 1. The delay circuit 1 accepts the main signal a and provides it as a delayed signal b delayed by the time of one horizontal scanning period 1H. The delayed signal b is subtracted from the main signal a by a subtracting circuit 2 in the parallel circuit path. The level of the signal appearing at the output of the subtracting circuit 2 is divided in half by a dividing circuit 3 to produce the divided signal c. The divided signal c passes through a limiter 4 in the parallel circuit path to clip the portion of the divided signal c above a certain level and provide a clipped signal d. The clipped signal d is subtracted from the main signal a by a subtracting circuit 5 in the main circuit path to provide the output signal e, which is a modified signal Y' having less noise than the main signal a.

Figure 5A:
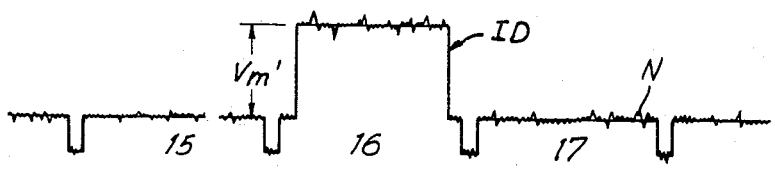
FIGS. 5A–5E depict the waveforms of the signals at various points in the noise reduction circuit shown in FIG. 4.
Figure 5B:
Figure 5C:
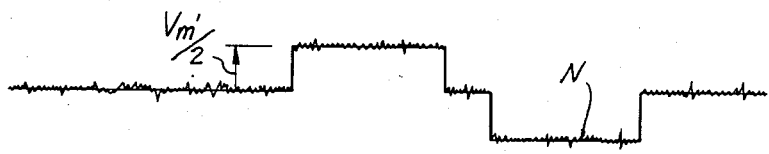
Figure 5D:
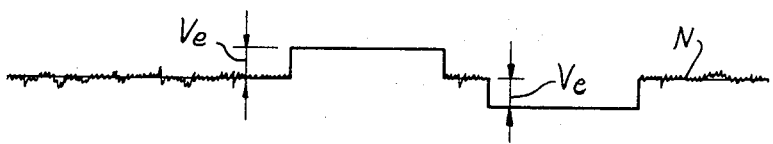
Figure 5E:
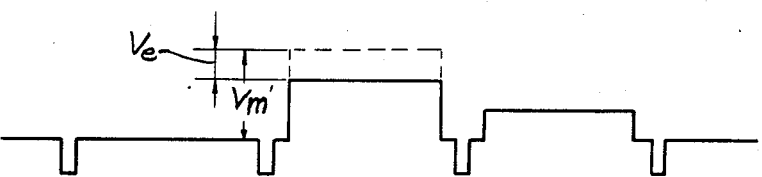

FIGS. 5A–5E illustrate how the noise reduction circuit shown in FIG. 4 operates. The letter suffixes used to identify FIGS. 5A–5E correspond to the signals a through e discussed in connection with FIG. 4. Part of the vertical blanking portion of the received video signal after demodulation is shown in FIG. 5A. It includes the identification signal ID in the sixteenth horizontal period. A noise component N is shown superimposed on the signal. After passing through the delay circuit the delayed signal b shown in FIG. 5B has an orientation relative to the main signal a as shown by comparing FIGS. 5A and 5B. After subtraction and division in the circuits 2 and 3, the divided signal c appears as shown in FIG. 5C. The limiter 4 clips the signal c at the level $V_e$ and the clipped signal d has the waveform shown in FIG. 5D. When the clipped signal d is subtracted from the main signal a, the output signal e, as shown in FIG. 5E, results. The noise component N is significantly reduced in all portions of the signal except in the identification signal ID. But the presence and timing of the identification signal ID remains recoverable even when combined with the noise component, so that for those purposes it is not critical that the identification signal be subject to noise reduction.

The operation of the noise reduction circuit is best understood mathematically. The signal a can be expressed:

$$Y_a = S + N \tag{1}$$

The delayed signal b, then is:

$$Y_b = S_D + N_D \tag{2}$$

And the divided signal c is equation (1) subtracted from equation (2) and divided by two:

$$Y_c = Y_a - Y_b = \tfrac{1}{2}[(S-S_D)+(N-N_D)] \tag{3}$$

Other than at the identification portion ID, $S = S_D$, so that $$Y_c = \tfrac{1}{2}(N - N_D) \tag{4}$$

At the portions of the signal represented by equation (4), the limiter circuit 4 has no effect if the clipping level $V_e$ is greater than the largest noise component. Thus, $Y_d = Y_c$ for those portions.

Then, when $Y_d$ is subtracted from $Y_a$ by the subtracting circuit 5, the output signal e, or Y', is:

$$Y' = Y_e = S + N - \tfrac{1}{2}(N - N_D), \text{ or} \tag{5}$$

$$Y' = S + \tfrac{1}{2}N + \tfrac{1}{2}N_D \tag{6}$$

Although it would appear from equation (6) that there has been no reduction in the noise level of the signal, the effect of the noise component changes as the square of the noise level. Thus, if the total noise in equation (6) is expressed:

$$N_T = \tfrac{1}{2}N + \tfrac{1}{2}N_D \tag{7}$$

then the effect of each component on the signal Y' can be expressed as $\tfrac{1}{4}N^2 + \tfrac{1}{4}N_D^2$, or, if N is assumed to be approximately equal to $N_D$, then the effect of the noise component is $\tfrac{1}{2}N^2$. Thus, the modified, reduced-noise signal Y' effectively has only half as much noise at all portions other than at the identification signal ID. There, the signal still has the same amount of noise since the noise component was removed by the limiter 4.

In any case, the effect of the noise reduction circuit on the identification level $V_m'$ is depicted in FIG. 5E. Instead of $V_m'$ having the known, predetermined relation to the reference level $V_m$, $V_m'$ is now changed by the amount $V_e$. Thus, $V_m'$ no longer can be used to derive the reference level $V_m$ for generating the decoding axis to decode the signal.

The video signal of the present invention uses an identification signal ID having substantially the same level in two consecutive horizontal periods, as shown in FIG. 6. As depicted in FIG. 6A, the broadcast and received signal has a first identification signal $ID_1$ in the 15th horizontal period and a second identification signal $ID_2$ in the 16th horizontal period of a vertical blanking interval. The letter suffixes in FIGS. 6A–6E correspond with the signals a through e as discussed in connection with FIGS. 4 and 5A–5E. After passing through the delay circuit 1, the signal has the waveform shown in FIG. 6B. As shown in FIGS. 6C and 6D, the divided signal c and the clipped signal d have a 16th horizontal period (relative to the main signal a) which is at the same level as that obtained when two periods without identification signals are subtracted in the subtracting circuit 2. In other words, the portion of the clipped signal d corresponding to the 16th horizontal scanning period of the main signal a is zero.

Figure 6A:
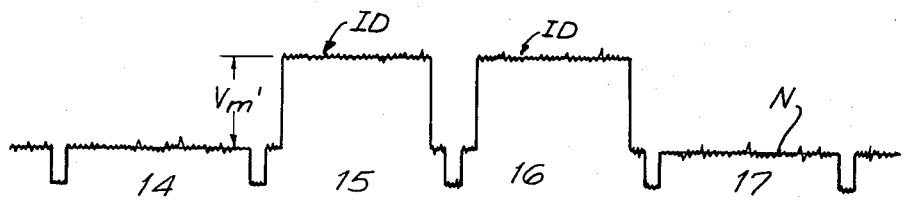
FIGS. 6A–6E depict the waveforms of the signals at the same points in the noise reduction circuit shown in FIG. 4 using the video signal of the present invention.
Figure 6B:
Figure 6C:
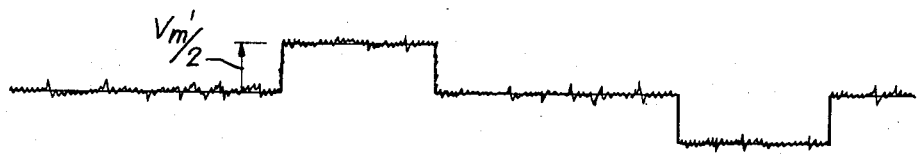
Figure 6D:
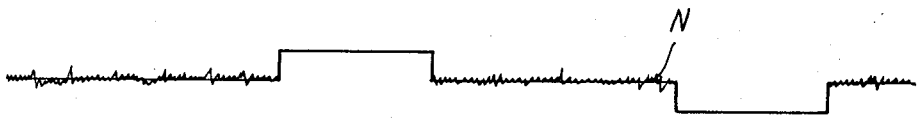
Figure 6E:
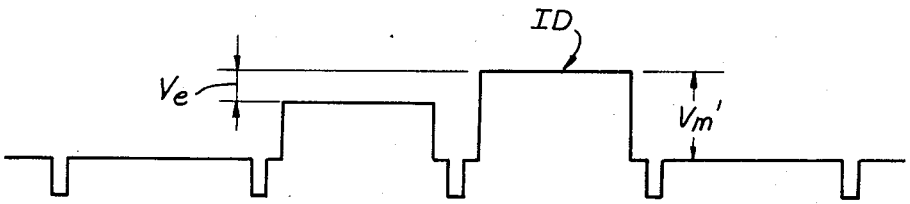

Therefore, the level of the identification signal $ID_2$, which was $V_m'$ when received, is still $V_m'$ after the signal passes through the noise reduction circuit, as seen in FIG. 6E. The decoding axis can thus be accurately set at the reference level $V_m$ even though the signal has been subject to noise reduction. Of course, if key codes were included in other consecutive horizontal periods, they could also be recovered unchanged by the noise reduction circuit.

Figure 7:
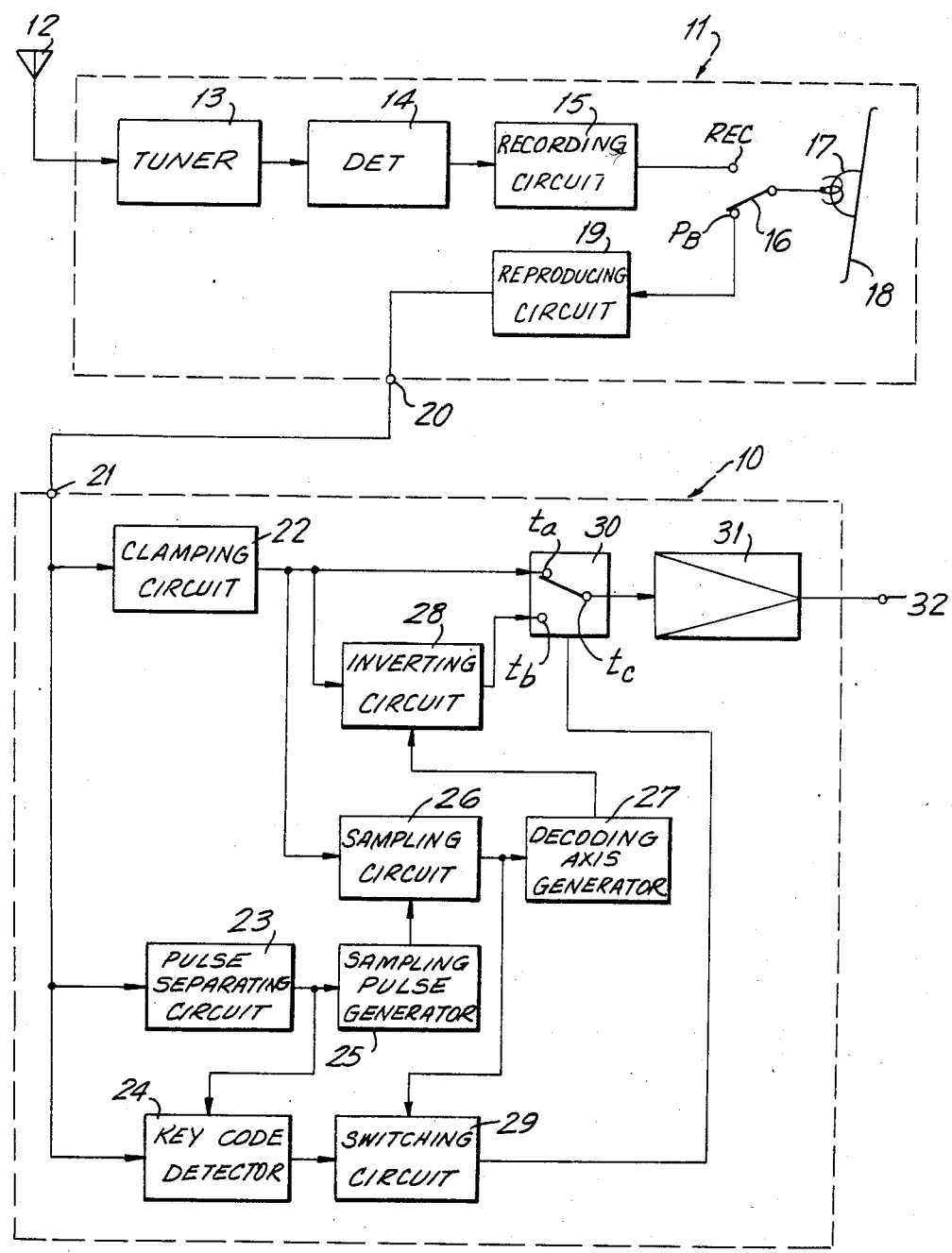
FIG. 7 schematically illustrates a video signal receiving apparatus for decoding a video signal in accordance with the present invention.

FIG. 7 schematically illustrates a video signal receiving apparatus which includes a decoding circuit 10 for unscrambling the signal depicted in FIG. 6E.

A VTR 11 receives a broadcast signal from an antenna 12. The received signal is provided to a tuner 13 and from the tuner 13 to a detector 14. The detector 14 provides a signal to a recording circuit 15 which, in the conventional manner, frequency modulates the luminance portion of the composite video signal and converts the chrominance portion to a lower frequency. The signal from the recording circuit 15 is supplied to the record terminal REC of a switch 16. When the switch 16 provides a circuit path through the terminal REC, the received signal is supplied to a magnetic head 17 for recording on the tape 18.

When the recorded signal is reproduced, the switch 16 provides a circuit path through a playback terminal $P_B$. The reproduced signal is supplied to a reproducing circuit 19 that demodulates the luminance portion and converts the chrominance portion to the original higher frequency. The reproduced signal is supplied to a VTR output terminal 20.

The decoding circuit 10 has an input terminal 21 that accepts the composite video signal. The composite signal is supplied to a clamping circuit 22, a pulse separating circuit 23 and a key code detector 24. The output of the pulse separating circuit 23 is supplied to a sampling pulse generator 25. The sampling pulse therefrom is fed to a sampling circuit 26, which also accepts the output of the clamping circuit 22.

A decoding axis generator 27 accepts the output of the sampling circuit 26 and provides a signal to an inverting circuit 28. The inverting circuit 28 accepts the output of the clamping circuit 22 and, using the output of the decoding axis generator 27, inverts the output of the clamping circuit 22 about the decoding axis.

The output of the key code detector 24 is supplied to a switching circuit 29, the output of which is fed to a switch 30. The switching circuit 29 controls the switch 30 in response to the key code supplied by the key code detector 24 and the output of the sampling circuit 26. The switch 30 comprises two fixed terminals $t_a$ and $t_b$ and a movable terminal $t_c$. When the switch 30, as controlled by the switching circuit 29, provides a circuit path between the terminals $t_a$ and $t_c$, the composite signal, as reproduced, is provided directly to the terminal $t_c$. When the circuit 29 provides a circuit path between the terminals $t_b$ and $t_c$, the output of the inverting circuit 28 is supplied to the terminal $t_c$.

A buffer amplifier 31 accepts the signal at the terminal $t_c$ and provides an output to the output terminal 32 of the decoding circuit 10. The signal at the output terminal 32 is used to generate a television picture by conventional means.

The decoding circuit 10 operates as follows. The clamping circuit 22 clamps the pedestal level of the composite signal from the reproducing circuit 19. The horizontal and vertical synchronizing pulses in the video signal are extracted by the pulse separating circuit 23.

The sampling pulse generator 25 uses the horizontal and vertical synchronizing pulses provided by the pulse generating circuit 23 to provide a sampling pulse for each horizontal interval containing the second identification signal $ID_2$, the identification level $V_m'$ of which, it will be recalled, was unaffected by the noise reduction circuit. In any particular encoding system the horizontal interval to be sampled is known, and the sampling pulse generator 25 provides a pulse for sampling that interval. The sampling circuit 26 uses that sampling pulse to sample the proper portion of the level of the video signal from the clamping circuit 22. Thus, the level which is sampled is that of the second identification signal $ID_2$ and the output of the sampling circuit 26 is at the identification level $V_m'$.

The output of the pulse separating circuit 23 is also supplied to the key code detector 24. The key code detector 24 uses the output of the pulse separating circuit 23 to locate the key code in the video signal from the VTR and supply to the switching circuit 29 a code signal in response to the key code. The switching circuit 29 also accepts the identification signal $ID_2$, which functions as a timing signal for the switching circuit 29. The switching circuit 29 uses the identification signal and the key code to provide a switching signal at the proper times depending on the horizontal intervals where the signal was inverted.

The identification level $V_m'$ is used by the decoding axis generator 27 to generate the reference level $V_m$ about which the broadcast signal was inverted. The signal from the clamping circuit 22 is inverted about that decoding axis before being supplied to the switch terminal $t_b$. The switch 30, as controlled by the switching circuit 29, provides a circuit path for the restored video signal from the inverting circuit 28 at the horizontal periods in which the video signal was inverted. Otherwise, the switch 30 provides a circuit path in which the video signal is supplied directly to the buffer amplifier 31 from the clamping circuit 22. Thus, the signal supplied to the output terminal 32 of the decoder 10 is identical to the original signal that was scrambled prior to broadcasting.

Those skilled in the art will recognize that the decoding circuit 10 can be by-passed so that the output of the reproducing circuit 19 is used directly to generate a television picture if the recorded signal was not encoded on broadcasting. In fact, the decoding circuit 10 can be automatically included and excluded from the receiver by using the existence or absence of the identification signal ID as an indication that the recorded signal was encoded. If an identification signal is present, the video signal is supplied to the terminal 21. If not, it is supplied directly to the means for generating the television picture.

Thus, the video signal and the decoding apparatus of the present invention enable proper decoding of a recorded, video signal when it is played back, even when a noise reduction circuit is used in the recording apparatus.

Although specific embodiments of the invention have been described in detail herein with reference to the accompanying drawings, it is to be understood that the invention is not limited to those embodiments, and that various changes and modifications can be effected therein by one skilled in the art without departing from the scope or spirit of the invention as defined in the appended claims.

What is claimed is:

1. A method of decoding a broadcast encoded video signal which comprises a scrambled portion encoded with reference to an encoding axis which is at a predetermined reference level prior to broadcasting the signal, and first and second identification signals in consecutive horizontal periods of the video signal at substantially the same identification level in both of said periods, with said identification level having a predetermined value relative to said reference level, the decoding method comprising the steps of:

detecting said identification level of said second identification signal; and generating a decoding axis at said reference level in response to said identification level of said second identification signal.

2. A method of decoding a broadcast encoded video signal as in claim 1; and in which the scrambled portion of the video signal is encoded by inversion about the encoding axis; further comprising the steps of:

inverting all of the video signal about said decoding axis; and selectively providing the unscrambled portion and inverted scrambled portion of the video signal to means for generating a television picture.

3. Apparatus for decoding an encoded video signal received with a scrambled portion encoded using an encoding axis at a reference level chosen prior to broadcasting the signal and first and second identification signals in first and second consecutive horizontal periods of the video signal, respectively, both identification signals having substantially the same identification level, which identification level has a predetermined relation to the reference level, the apparatus comprising:

identification signal detecting means for determining the identification level of the second identification signal;

decoding axis generating means for generating a decoding axis at the reference level in response to the detection of the identification level of the second identification signal; and decoding means for decoding the scrambled portion of the video signal using said decoding axis.

4. Apparatus as in claim 3 for decoding a video signal that includes coding information indicating the location of the scrambled portion of the signal; wherein the apparatus includes an input for receiving the encoded video signal and an output for supplying the decoded video signal and said decoding means includes:

switch means for selectively providing one of two circuit paths therethrough, one of said circuit paths passing the video signal received at the input of the apparatus to the output thereof and the other said circuit path providing said decoded video signal portion to the output of the apparatus; and code detector means responsive to the coding information in the video signal for providing a code signal indicating the location in the video signal of the scrambled portions thereof, said code detector means including switch controlling means responsive to said code signal for supplying a switching signal to said switch means to provide said first circuit path for the unscrambled portions of the video signal and said second circuit path for the scrambled portions of the video signal.

5. Apparatus as in claim 4; wherein:

the scrambled portion of the video signal includes a plurality of encoded horizontal periods arranged in a predetermined coding pattern; and the coding information in the video signal indicates said coding pattern.

6. Apparatus as in claim 3; wherein said identification signal detecting means includes:

pulse generating means responsive to the video signal received by the apparatus for generating a sampling pulse indicating the location in the video signal of the second identification signal; and sampling circuit means responsive to said sampling pulse for sampling said second horizontal period to determine said identification level.

7. Apparatus as in claim 6; wherein said pulse generating means includes:

pulse separating means for accepting the video signal and separating therefrom horizontal and vertical synchronizing pulses; and sampling pulse generating means responsive to the horizontal and vertical synchronizing pulses for generating said sampling pulse.

8. Apparatus as in claim 6; wherein:

the video signal is encoded by inverting portions thereof to provide the scrambled portion of the signal;

said decoding axis generating means is responsive to said sampling circuit means for generating a decoding axis at said reference level; and said decoding means includes an inverting circuit for inverting the video signal received by the apparatus about said decoding axis.

9. Apparatus as in claim 8 for decoding a video signal that includes coding information indicating the location of the scrambled portion of the signal; wherein the apparatus includes an input for receiving the encoded signal and an output for supplying the decoded video signal and said decoding means further includes:

switch means for selectively providing one of two circuit paths therethrough, one of said circuit paths passing the video signal received at the input of the apparatus to the output thereof and the other said circuit path providing said decoded video signal portion from said inverting circuit to the output of the apparatus; and code detector means responsive to the coding information in the video signal for providing a code signal indicating the location in the video signal of the scrambled portions thereof said code detector means including switch controlling means responsive to said code signal for supplying a switching signal to said switch means to provide said first circuit path for the unscrambled portions of the video signal and said second circuit path for the inverted portions of the video signal.

10. Apparatus as in claim 9; wherein:

the scrambled portion of the video signal includes a plurality of inverted horizontal periods arranged in a predetermined coding pattern; and said switch controlling means provides a switching signal in response to said code signal and the output of said sampling circuit means.

11. Apparatus as in claim 10; wherein the video signal is encoded by inverting a plurality of vertical intervals thereof in a predetermined pattern.

* * * * *